2,977,275
CONTINUOUS DIGESTION PROCESS AND APPARATUS

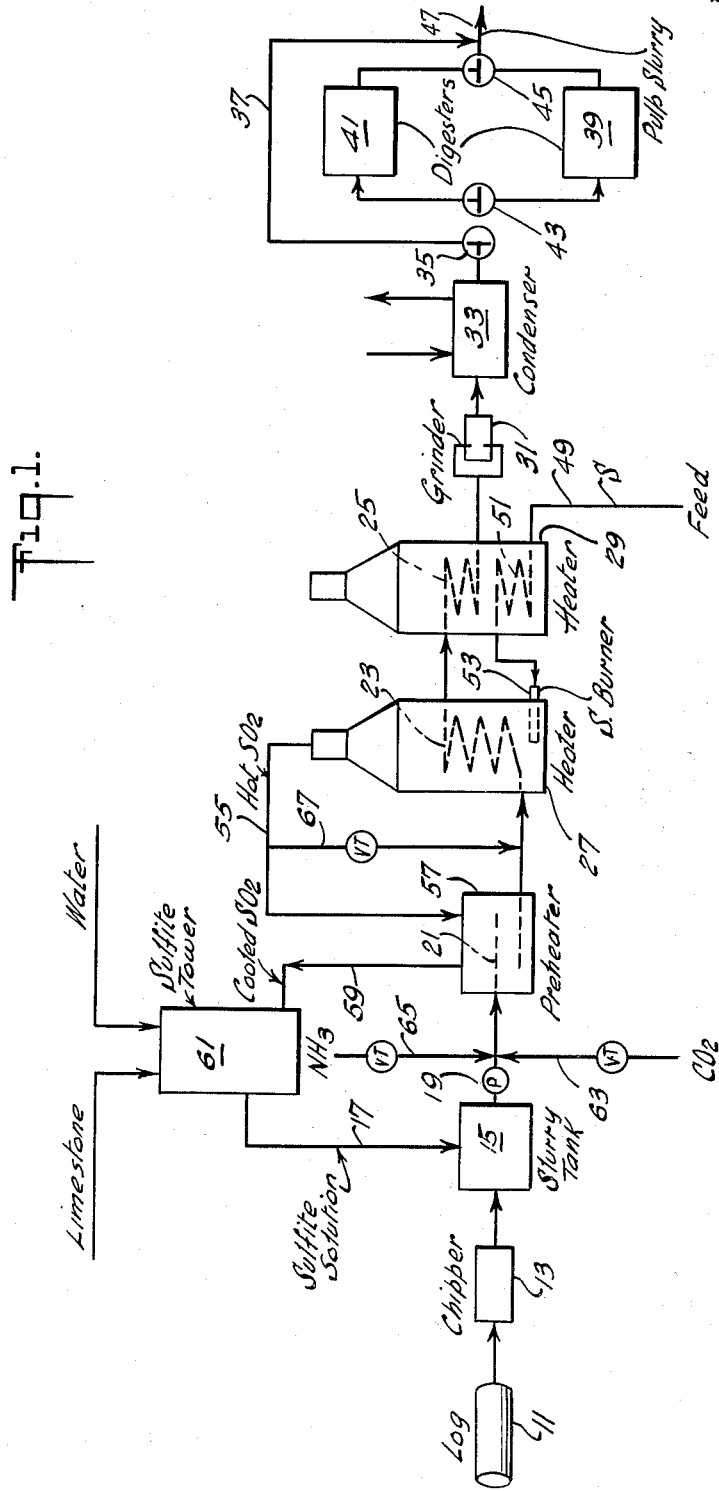

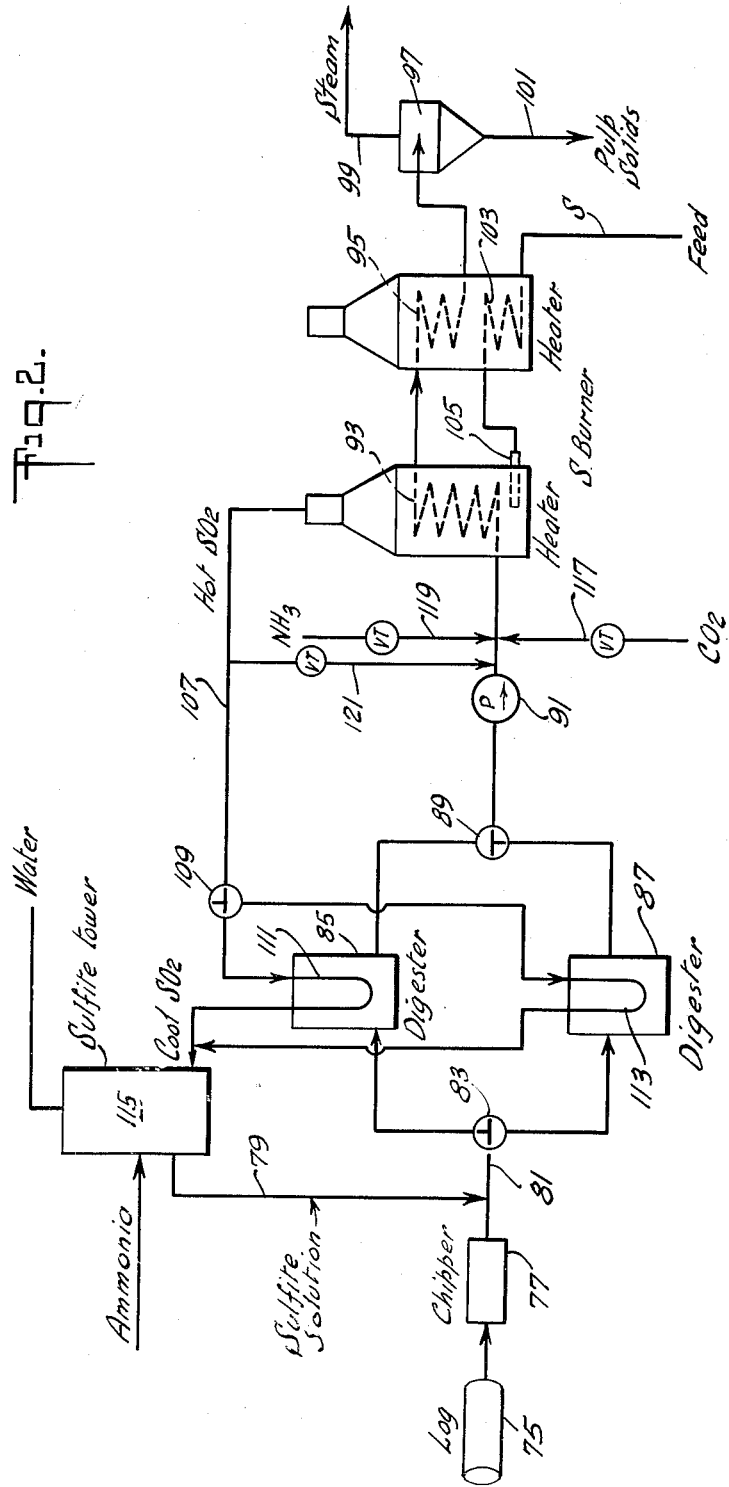

Lincoln Thomas Work, Maplewood, N.J., assignor to Texaco Development Corporation, New York, N.Y., a corporation of Delaware Filed Sept. 9, 1955, Ser. No. 533,326

13 Claims. (Cl. 162—64)

The present invention relates to a novel process and apparatus for manufacturing pulp from fragments of cellulosic substances such as wood, reeds, corn stalks, bagasse, and the like.

In the following description the invention will be exemplified in the manufacture of paper pulp from wood, but it is to be understood that the principles also apply to other cellulosic substances, and to the manufacture of pulp for cellophane and other cellulosic products. Therefore, the terms "wood" and "paper pulp" are intended to embrace such equivalent substances.

In accordance with this invention paper pulp is manufactured by first forming a flowable mixture, such as a thin slurry, of relatively coarse particles of wood in vaporizable liquid, such as a water solution containing delignifying chemicals. This mixture is then passed as a flowing stream into a confined heating zone wherein it is heated sufficiently to vaporize a substantial part or all of the liquid and form a dispersion of wood particles in vapor, such as steam. The delignifying chemicals act on each wood particle both in the slurry and in the dispersion to penetrate to its interior, and act upon the lignin to change its character and remove it from the wood fibers.

The chemically treated particles of wood are then disintegrated in a continuously flowing stream by passing the dispersion through a succeeding zone of high velocity flow, and subjecting the flowing stream therein to turbulence and a high velocity. The velocity should be greater than 25 feet per second and preferably is in excess of 100 feet per second, so that the cooked wood particles impinge against one another with great force and are disintegrated to finely divided fibers. Velocities may range as high as several thousand feet per second.

Delignifying chemicals of well known types may be employed in the process described above for treating the wood particles. For example, the wood particles may be initially mixed into an acid sulfite solution containing calcium, sodium, magnesium, or ammonium sulfites, such solution also containing free sulfur dioxide to react with the lignin and form lignin sulfonate. Ammonia also may be used, with or without sulfur dioxide.

Alternatively, the wood particles may be mixed with an alkaline pulping solution such as one containing sodium hydroxide as the major cooking chemical, with or without sodium sulfide.

While ordinarily my novel process will make possible an extremely rapid operation for converting wood particles to pulp, it may sometimes be necessary to hold the wood particles in contact with the chemical pulping reagent for a period longer than is possible with continuous flow, to assure complete digestion. Such a holding period may be either before or after passing the slurry through the disintegrating system, preferably after to lessen the time required for the chemical solution to penetrate the smaller particles then available.

Important advantages of my new method are continuity, rapidity and economy of operation. Also, feed of the chips in a liquid makes it unnecessary to provide lock hoppers and other expensive or cumbersome means for introducing the wood chips into high pressure steam. Additionally, cooking and softening of the wood fragments occur as an integral part of the process. The net result is the rapid and economical formation of unusually thin fibers whereby a superior paper product may be produced.

In the drawings:

Fig. 1 is a schematic flow diagram of apparatus for performing an embodiment of the invention wherein provision is made for digesting the disintegrated wood particles downstream of the disintegrating apparatus; and Fig. 2 is a schematic flow diagram of apparatus for performing another embodiment of the invention wherein digestion of the wood particles is carried out upstream of the disintegrating apparatus.

Referring to Fig. 1, a log 11 is passed to a chipper 13 wherein the wood is chipped to form coarse particles. Ordinarily chip sizes range from about 6 mesh (U.S. Standard) up to an average length of about ¾ inch.

The chips are passed to a slurry tank 15 wherein they are mixed with a water solution of pulping chemicals supplied by a line 17 from a source to be described more in detail hereinafter. Ordinarily, a ratio of 2.5–5 parts of water solution to 1 part of dry wood particles by weight should be maintained, the lower ratio being used with magnesium base or other soluble base, the higher with calcium base liquors.

The resulting flowable slurry of wood chips in sulfite solution is passed by a pump 19 into a preheater tube 21 and then into second and third coiled tubes 23 and 25 located in heaters 27 and 29, respectively for heating to vaporize water content of the slurry and form a flowing dispersion of wood chips in steam. At the same time the chips are cooked and softened.

Heaters 27 and 29 may be fired in any desired manner, as by gas or oil, but I prefer to fire one of the heaters by burning elemental sulfur to produce the sulfur dioxide required for the process, as will be described more in detail hereinafter. The tubes 23 and 25 may be formed as coils or as short straight pipe lengths connected by return bends. Pipe size depends upon the size of the chips and the capacity of the plant, pipe lengths ranging from as little as 200 feet to as much as 2000 feet, and pipe diameters ranging from as little as ½ inch to as much as 2 inches or more ordinarily being employed.

Pump 19 maintains a high pressure on the inlet of coil 23, such as a pressure of 70 to 400 pounds per square inch gauge, but the pressure decreases through the tube until it is between atmospheric and about 200 pounds per square inch downstream of the grinder. Subatmospheric pressure may also be used at the outlet.

With the above pressure conditions, complete vaporization is obtained when the dispersion is heated to a maximum temperature of about 150° C., which experience has shown should not be exceeded if the best quality of pulp is to be obtained. However, higher inlet pressures with correspondingly higher temperatures are usable if pulp quality is not paramount.

It is advantageous to supply heat to the mixture at such a rate that a substantial portion of the liquid, say 10 to 30% remains unvaporized to receive particles of wood ingredients, to prevent accumulation of solids on the tube walls by constantly washing them with liquid, and to retain the lignin salts in solution.

The dispersion from coil 25 enters a fluid energy grinder 31 of the opposed nozzle type wherein two high velocity jets of dispersion are projected against one another at a large angle, such as 180°, so as to cause the particles of wood to impinge against one another with great force and disintegrate to small fibers. Such a grinder is disclosed in my U.S. application Ser. No. 360,188, filed June 8, 1953.

The resulting dispersion of fibers in steam passes to a water cooled condenser 33 wherein a pulp slurry is formed which may then be discharged through a conduit 37 and treated subsequently in conventional fashion, as by filtering and washing preparatory to the actual formation of a sheet of paper.

Sometimes the disintegrated fibers require additional time for the chemical solution to complete its reaction with the constituents of the wood. Then a 3-way valve 35 is turned so that the slurry flows to a second 3-way valve 43, and thence to one of a pair of digesters 39 and 41. Assuming that the valve 43 is turned for flow into the digester 41, this digester is completely filled with pulp slurry which is allowed to remain there for the necessary period to complete digestion. Meanwhile, the valve 43 is turned so that slurry flows into digester 39 in a similar fashion. Upon completion of the reaction in digester 41 a 3-way valve 45 is turned so that the digested slurry flows into discharge conduit 47 for subsequent filtering and washing. Digester 41 is then ready for refilling, during which period the slurry from digester 39 flows through valve 45 into conduit 47. It is apparent that the amount of time required for digestion may make it necessary to use more than two digesters. Principles of operation are the same, however, as described above for the two digesters 39 and 41.

As mentioned above, sulfur may be burned to heat slurry in heater 27. This is accomplished by feeding solid sulfur from a conduit 49 into a coil 51 in the second heater 29 so that the sulfur is melted and is then passed over to a burner nozzle 53 in heater 27. Air or oxygen is pumped into the burner 53 and atomizes the liquid sulfur which then burns to supply its heat to the coil 23 and to produce sulfur dioxide as the principal product of combustion. Hot sulfur dioxide passes off the top of heater 27 through a conduit 55 and enters the preheater 57 wherein it exchanges its heat with the incoming slurry in tube 21 and is itself cooled to a low temperature, such as about 30° C., to assure subsequent rapid solution in water.

The cooled sulfur dioxide then passes through a conduit 59 into a sulfite tower 61 wherein it flows upwardly through a series of trays containing crushed limestone while water flows downwardly over the trays. As a result there is formed a water solution containing calcium sulfite and free sulfur dioxide which flows through conduit 17 into slurry tank 15 as previously described. A sulfite cooking acid prepared in this way will contain about 6 to 10% of total sulfur dioxide and 0.1% to 6% of free sulfur dioxide by weight.

Instead of using limestone, the sulfite may be prepared from other more soluble bases such as sodium, magnesium, or ammonium hydroxide in tower 61.

In order to assure the necessary high velocity of dispersion through the coils 23 and 25 and the grinder 31 without employing excessive temperatures, it is sometimes desirable to bleed auxiliary gases into the system downstream of the slurry tank 15. As shown in Fig. 1, carbon dioxide or ammonia may be supplied through conduits 63 or 65, respectively, between slurry tank 15 and pump 19. Alternatively or supplementally, free sulfur dioxide may be bled off of line 55 by a conduit 67 connected into the system between preheater coil 21 and the heater 27. These gases not only will provide increased volume and resultant higher velocity, but they also react with the wood particles to assist in the digestion and removal of undesirable constituents as they pass through the system.

*Example I*

Douglas fir chips ¾ inch in maximum length are continuously mixed with calcium sulfite liquor flowing continuously into tank 15 to form a slurry containing 4.5 pounds of liquor per pound of dry wood. The sulfite liquor contains 1.2% of combined sulfur dioxide and 4.8% of free sulfur dioxide by weight.

This slurry passes at a rate of 1500 pounds per hour, a temperature of 50° C., and a pressure of 200 pounds per square inch into and through heater coils 23 and 25 of 2 inch pipe having a total length of 800 feet, wherein a dispersion is formed at a top temperature of 150° C. This dispersion flows into grinder 31 and through a pair of 180° opposed nozzles having one inch orifices to disintegrate the cooked wood particles. After condensation in condenser 33 the pulp slurry leaves the system through conduit 37.

Heating of the slurry in coil 23 is accomplished by burning 80 pounds per hour of free sulfur with oxygen and forming sulfite solution with the resulting sulfur dioxide.

Referring to Fig. 2, there is shown a modification of the invention wherein the wood particles are held for digestion before they are disintegrated. A log 75 passes to a chipper 77 and the chips are picked up by a sulfite solution flowing from a conduit 79 into a conduit 81. The resulting slurry then passes through a 3-way valve 83 to digester 85 and digester 87 alternately. When digester 85 is filled the valve 83 is adjusted so that slurry then flows into digester 87. Upon completion of digestion in 85 the mixture of wood chips and sulfite solution passes through a 3-way valve 89 to a pump 91 and thence through heated pipe coils 93 and 95, as described in connection with Fig. 1. A battery of more than two digesters may also be used to assure continuous operation.

Instead of using an opposed nozzle grinder as in Fig. 1, the pressure drop through the pipe coils themselves is employed to assure a velocity in the coils in excess of 25 feet per second, and usually in excess of 100 feet per second, so that the particles impinge against one another and are disintegrated to fine fibers. The dispersion then flows to a separator 97, such as a centrifugal cyclone, wherein steam is removed at the top through a line 99 and pulp solids are discharged at the bottom through an outlet 101. Pulp then passes to subsequent washing operations before conversion to paper.

When digester 85 has been emptied the valve 89 is turned so that digester 87 is onstream and its contents are then passed through the system in like manner. Meanwhile refilling of digester 85 is accomplished by turning valve 83 to the proper positions.

As described in connection with Fig. 1, sulfur is melted in a coil 103 and burned in a nozzle 105 to heat the slurry and produce hot sulfur dioxide. The latter passes off the top through a conduit 107 and may be employed to heat the slurry in the digesters 85 and 87 while at the same time being cooled to a temperature low enough for sulfite production in tower 115. A 3-way valve 109 may be turned so that the hot sulfur dioxide flows to either of the heat exchange pipes 111 or 113.

The cooled sulfur dioxide flows into the bottom of sulfite tower 115 where it comes into intimate contact with an ammonium hydroxide solution produced by passing water and ammonia concurrently into the upper portions of the tower so as to flow downwardly therethrough. The resultant ammonium sulfite solution containing excess sulfur dioxide is delivered by conduit 79 into the system as described previously.

Here also, velocity and turbulence may be increased while keeping the temperature down by introducing such gases as carbon dioxide or ammonia, and/or sulfur dioxide through conduits 117, 119 and 121 respectively.

*Example II*

Birch wood chips averaging about ½ inch in length are continuously mixed with ammonium sulfite liquor in conduit 81 and passed into a digester tank holding 3 tons of slurry. The slurry comprises 3 pounds of liquor per pound of dry wood; and the liquor contains 2% of combined and 4% of free sulfur dioxide by weight.

After holding the slurry in digester 85 at a temperature of 45° C. for a period of 4 hours, the valve 89 is turned to place digester 85 onstream and slurry is pumped through pipe coils 93 and 95 under the same conditions as in Example I, with atmospheric pressure being employed at the outlet of coil 95. The particles of soft cooked wood are disintegrated by impact with one another as the dispersion flows at high velocity, after which steam is separated off in cyclone 97.

When the principles of the invention are applied to alkaline pulping, the same general arrangement of apparatus and the same general principles of operation are employed. However, instead of burning sulfur as a source of heat and sulfur dioxide and then forming the sulfite solution as an integral part of the process, there is fed into the system through the lines 17 or 79 either a sodium hydroxide solution, or a solution containing sodium hydroxide and sodium sulfide, which is then employed to make up the slurry. Ordinarily the alkaline solution is mixed with wood particles in proportion to form a slurry containing between about 5% and 65% by weight of wood fragments.

Obviously many modifications and variations of the invention, as hereinbefore set forth, may be made without departing from the spirit and scope thereof, and therefore only such limitations should be imposed as are indicated in the appended claims.

I claim:

1. A process for manufacturing pulp comprising forming a flowable mixture of relatively coarse particles of cellulosic substance in vaporizable liquid; bringing delignifying chemical into contact with said substance; passing said mixture as a flowing stream into and through a confined heating zone; introducing a separate stream of gas selected from the group consisting of carbon dioxide, ammonia and sulfur dioxide into said confined heating zone concurrently with said flowing stream, said gas acting to increase the velocity of said flowable mixture and subsequent dispersion, and also to assist in the digestion of said particles; heating said mixture as it flows through said zone sufficiently to vaporize at least 70% of said liquid to vapor, forming therein a flowing dispersion of said particles in said gas and said vapor; and disintegrating said particles by passing said dispersion through a succeeding zone of high velocity flow and subjecting the flowing stream in said succeeding zone to turbulence and a high velocity in excess of 25 feet per second.

2. A process in accordance with claim 1 wherein said delignifying chemicals include sulfite liquor, and wherein said gas is sulfur dioxide.

3. A process in accordance with claim 1 wherein said delignifying chemicals include sulfite liquor, and wherein said gas is ammonia.

4. A process in accordance with claim 1 wherein said delignifying chemicals include sulfite liquor, and wherein said gas is carbon dioxide.

5. A process in accordance with claim 1 wherein said mixture is heated to such an extent that between 10 and 30% of said vaporizable liquid remains unvaporized and acts to prevent accumulation of solids on the walls of said heating zone by washing them with liquid and also acts to retain the lignin salts in solution.

6. A process for manufacturing paper pulp comprising forming a flowable mixture of relatively coarse particles of cellulosic substance in vaporizable liquid; bringing delignifying chemical into contact with said substance; passing said mixture as a flowing stream into and through a confined heating zone; heating said mixture as it flows through said zone sufficiently to vaporize said liquid by burning sulfur to produce heat and sulfur dioxide, thereby forming in said zone a flowing dispersion of said particles in vapor; disintegrating said particles by passing said dispersion through a succeeding zone of high velocity flow and subjecting the flowing stream in said succeeding zone to turbulence and a high velocity; forming sulfite liquor from said sulfur dioxide; and bringing said sulfite liquor into contact with said cellulosic substance as said delignifying chemical.

7. A process in accordance with claim 6 wherein said mixture is further heated in a second heater subsequently to heating by sulfur combustion, and wherein sulfur for combustion is melted in said second heater and fed to said first heater for combustion therein.

8. A process in accordance which claim 6, also comprising passing hot sulfur dioxide in heat exchange relationship with said flowable mixture upstream of said heating zone for preheating said mixture.

9. A process in accordance with claim 8 wherein said hot sulfur dioxide is passed into heat exchange relationship with said mixture as it passes into said confined heating zone.

10. A process in accordance with claim 8, also comprising holding said mixture in contact with said sulfite liquor in a digester upstream of said heating zone, and passing said sulfur dioxide in heat exchange relationship with the mixture in said digester for preheating said mixture.

11. Apparatus for manufacturing paper pulp comprising a tank for forming a mixture of sulfite solution and wood particles, a heater tube connected to said tank for heating said mixture to vaporize water therefrom and form a dispersion of wood particles in steam; a sulfur burner in position for heating said tube by the combustion of sulfur with concurrent formation of sulfur dioxide; a sulfite tower; conduit means for carrying sulfur dioxide from said burner to said tower to form sulfite liquor therein; and a conduit for conducting sulfite liquor from said tower to said tank.

12. Apparatus in accordance with claim 11, also comprising a second heater tube for heating said slurry; means for heating said second heater tube; a sulfur heater in position to be heated by said means, for melting sulfur; said sulfur heater being connected to said sulfur burner for supplying molten sulfur thereto.

13. Apparatus in accordance with claim 11, also comprising means for passing hot sulfur dioxide from said sulfur burner in heat exchange relationship with said mixture for preheating said mixture and cooling said sulfur dioxide, before said sulfur dioxide enters said sulfite tower.

References Cited in the file of this patent

UNITED STATES PATENTS

| Number | Name | Date |
|---|---|---|
| 21,077 | Lyman | Aug. 3, 1858 |
| 40,696 | Lyman | Nov. 24, 1863 |
| 53,247 | Heaton | Mar. 13, 1866 |
| 67,455 | Russell | Aug. 6, 1867 |
| 70,485 | Tilghman | Nov. 5, 1867 |
| 223,670 | Farrell | Jan. 20, 1880 |
| 1,885,764 | Richardson | Nov. 1, 1932 |
| 1,908,615 | Oman | May 9, 1933 |
| 1,922,313 | Mason | Aug. 15, 1933 |
| 1,983,789 | Bradley et al. | Dec. 11, 1934 |
| 2,014,775 | McKee | Sept. 17, 1935 |
| 2,159,258 | DeLaRoza | May 23, 1939 |
| 2,385,955 | Tomlinson | Oct. 2, 1945 |
| 2,494,098 | Lockman | Jan. 10, 1950 |
| 2,673,690 | Segl | Mar. 30, 1954 |
| 2,676,883 | Goddard | Apr. 27, 1954 |
| 2,697,661 | Hollis | Dec. 21, 1954 |
| 2,698,789 | Segl | Jan. 4, 1955 |
| 2,889,242 | Teichmann | June 2, 1959 |

OTHER REFERENCES

Witham "Modern Pulp and Paper Making," page 155, second edition (1942), Reinhold Publishing Corporation, 330 W. 42nd St., New York, N.Y.